(12) United States Patent
Palanivelu et al.

(10) Patent No.: US 8,774,301 B1
(45) Date of Patent: *Jul. 8, 2014

(54) LOW COMPLEXITY TECHNIQUE FOR LOG-LIKELIHOOD RATIO COMPUTATION

(71) Applicant: Marvell International Ltd., Hamilton (BM)

(72) Inventors: Arul Durai Murugan Palanivelu, Sunnyvale, CA (US); Leilei Song, Sunnyvale, CA (US); Rohit U. Nabar, Sunnyvale, CA (US); Jungwon Lee, San Diego, CA (US); Sayandev Mukherjee, Santa Clara, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/672,141

(22) Filed: Nov. 8, 2012

Related U.S. Application Data

(63) Continuation of application No. 12/406,587, filed on Mar. 18, 2009, now Pat. No. 8,331,475.

(60) Provisional application No. 61/039,260, filed on Mar. 25, 2008.

(51) Int. Cl.
*H04L 23/02* (2006.01)

(52) U.S. Cl.
USPC .......................................... 375/262; 375/267

(58) Field of Classification Search
USPC .......................................... 375/259, 260, 262
See application file for complete search history.

(56) References Cited

U.S. PATENT DOCUMENTS

| | | | |
|---|---|---|---|
| 7,746,951 B2 * | 6/2010 | Hwang et al. | 375/267 |
| 2008/0225976 A1 * | 9/2008 | Prasad et al. | 375/267 |
| 2010/0002751 A1 * | 1/2010 | Dent | 375/141 |

OTHER PUBLICATIONS

Mujtaba, Syed Aon, TGn Sync Proposal Technical Specification, May 18, 2005, IEEE 802.11-04/0889r6, Institute of Electrical and Electronics Engineers, Inc., New York, New York.

LAN/MAN Standards Committee of the IEEE Computer Society, Part 16: Air Interface for Fixed and Mobile Broadband Wireless Access Systems, Feb. 28, 2006, IEEE Std. P802, 16e, Institute of Electrical and Electronics Engineers, Inc., New York, New York.

* cited by examiner

*Primary Examiner* — Qutbuddin Ghulamali

(57) ABSTRACT

Systems and methods for detecting data in a multiple input/multiple output signal. The method includes receiving a first signal associated with a first data value and a second signal associated with a second data value. A distance value between the received second signal and each possible second data value is calculated. Coordinates for a hypothetical first signal in light of a first possible second data value are calculated, and the first coordinate value is quantized to a nearest constellation point. A distance value between the received second signal and each possible second data value is calculated using the calculated constellation points. A determination is made of a log-likelihood ratio based on the determined distance values.

20 Claims, 9 Drawing Sheets

LOW COMPLEXITY TECHNIQUE FOR LOG-LIKELIHOOD RATIO COMPUTATION

CROSS-REFERENCE TO RELATED APPLICATIONS

This application is a continuation of U.S. patent application Ser. No. 12/406,587, filed on Mar. 18, 2009, which claims priority from U.S. Provisional Patent Application No. 61/039,260, filed on Mar. 25, 2008, and entitled "A Low Complexity Technique for Log-Likelihood Ratio Computation in MIMO Systems," the entirety of which is incorporated herein by reference.

FIELD

The technology described in this patent document relates generally to signal receivers and more particularly to likelihood ratio computation in signal receivers.

BACKGROUND

Multiple transmit/multiple receive (MIMO) antennas may be used to enhance communication data rates in standards that allow more than one spatial stream to be transmitted, such as WLAN (IEEE 802.11n), WiMax (IEEE 802.16e), 3G-LTE, etc. FIG. 1 is a block diagram 30 of a multiple spatial stream transmitter configuration. Transmit data 32 is provided as a stream of 1's and 0's to an encoder 34. The encoder 34 encodes the transmit data 32 with, for example, an error correcting code. The output of the encoder 34 is provided to a spatial stream splitter 36, which divides the bit stream from the encoder 34 into two spatial streams in some order. The two spatial streams are then propagated to a frequency modulator 38 which modulates the streams into symbols, which may be represented as a sequence of complex numbers. The frequency modulated signals are sent through a transmission channel, such as through the air, via one or more antennas 40.

Efficient detection/equalization of the transmitted signals is central to a MIMO receiver. FIG. 2 is a block diagram of a multiple spatial stream receiver configuration. Multiple spatial stream signals are received, such as via one or more antennas 52, from the transmission channel. The received multiple spatial stream signals may be represented by the equation: $y_k = Hs_k + w$, where $y_k$ represents an N×1 vector of received signals over N spatial streams at time k, H is a complex-valued N×2 matrix that represents a channel matrix identifying the combined effects of the transmission channel and spatial mapping of the transmitter on the transmitted signal, $x_k$ is an N×1 vector that represents transmitted data values that are sought to be recovered, and w represents noise. The above relationship pertains to a single frequency in a frequency-flat fading single-carrier modulated system or, alternatively, applies to individual frequency subcarriers or tones in an orthogonal frequency division multiplexing (OFDM) or similarly modulated system. The received multiple spatial streams are propagated to an equalizer/receiver 54 which calculates log-likelihood ratios (LLR(1) and LLR (2)) for each of the received spatial streams. The calculated log-likelihood ratios are ordered and combined by a log-likelihood ratio combiner 56 and made available to a decoder 58. The decoder 58 decodes the data received from the combiner 56 and generates output data 60.

In a two spatial stream system, each data symbol received, $x_i$, where i=1 corresponds to data transmitted on a first spatial stream, and i=2 corresponds to data transmitted on a second spatial stream, maps to n bits $\{b_1^{(i)}, b_2^{(i)}, \ldots, b_n^{(i)}\}$. $M=2^n$ is the alphabet size of the underlying modulation, such as binary phase shift keying (BPSK), quadrature amplitude modulation (QAM), etc., and the set of all possible scalar constellation points may be represented by A. The log-likelihood ratio (LLR) for a bit $b_k^{(i)}$ given a received vector y and a known channel matrix H may be represented as:

$$L(b_k^{(i)}) = \log \frac{P(b_k^{(i)} = 1)}{P(b_k^{(i)} = 0)} = \log\left\{\left(\sum_{x \in \chi_{k,i}} e^{-\|y-Hx\|^2/2\sigma^2}\right) \middle/ \left(\sum_{x \in \overline{\chi}_{k,i}} e^{-\|y-Hx\|^2/2\sigma^2}\right)\right\},$$

where $\chi_{k,i}$ is the set of all possible x vectors with $b_k^{(i)}=1$, and $\overline{\chi}_{k,i}$ is the set of all possible x vectors with $b_k^{(i)}=0$. In practice, the following simplification, called the Max-Log Approximation, is utilized:

$$L(b_k^{(i)}) \approx \min_{x \in \overline{\chi}_{k,i}} \|y - Hx\|^2 - \min_{x \in \chi_{k,i}} \|y - Hx\|^2.$$

There are several existing systems for detecting/equalizing received signals in multiple spatial stream systems. FIG. 3A is a block diagram 70 of a log-likelihood ratio calculator 72 that utilizes a linear equalizer 74. The linear equalizer 74 receives, via one or more antennas 76, a multi-spatial stream signal that has been transmitted through a channel and outputs a stream of log-likelihood ratios based on the received signals. For example, a zero-forcing equalizer is a linear equalizer that may be utilized, as illustrated in FIG. 3A. The zero-forcing equalizer seeks to recover the transmitted data values, $x_k$, from the received signal, $y_k$, that are modeled as, $y_k = Hx_k + w$, by assuming the noise vector is zero. Having a known channel effect matrix, H, enables calculation of data values, $x_k$, to be recovered from the received signal, $y_k$, as the data values are the only unknown remaining. While the zero-forcing equalizer has a simple design, the zeroing of the noise term makes the method prone to error as the noise term is almost certainly not zero in any real-world system.

FIG. 3B is a block diagram 80 of a log-likelihood ratio calculator 82 that utilizes a maximum-likelihood receiver 84. The maximum-likelihood receiver 84 receives a multi-spatial signal that has been transmitted through a channel, such as through the air, via one or more antennas 86, and outputs a stream of log-likelihood ratios based on the received signals. The maximum-likelihood receiver 84 is superior to most linear equalizers in error performance. However, maximum-likelihood receivers tend to be highly complex, such as having a complexity that grows exponentially with the number of spatial streams associated with the system.

FIG. 4A is a block diagram 100 of a maximum-likelihood receiver 102 that utilizes an exhaustive search methodology 104. The exhaustive search module 104 receives, via one or more antennas 106, a multi-spatial signal that has been transmitted through a channel and outputs a stream of log-likelihood ratios based on the received signals. In the exhaustive search methodology 104, the maximum likelihood receiver computes $\|y-Hx\|^2$ for all possible values of x. In a two spatial stream system, this results in $M^2$ total distance computations. The maximum-likelihood receiver then computes log-likelihood ratios accordingly.

FIG. 4B is a diagram illustrating exemplary calculations for the exhaustive search methodology in a 4-QAM setting. A real/imaginary plot of a received signal is shown at 112. The exhaustive search methodology calculates the distance term, $\|y-Hx\|^2$, for each of the constellation points. FIG. 4B illustrates only six of the distance calculations 114 to six of the constellation points 116 for ease in viewing. However, the exhaustive search method would process distance calculations for all of the 16 constellation points resulting in 16 distance terms to be considered in calculating an LLR. This problem is further exacerbated in popular, more complex encoding schemes such as 16-QAM, which would require 256 distance calculations with 256 distance terms to be considered in calculating an LLR. This order $M^2$, $O(M^2)$, complexity may introduce a significant bottleneck into the receiver system.

FIG. 5A is a block diagram 120 of a maximum-likelihood receiver 122 that utilizes a sphere decoding simplification 124. The sphere decoding methodology 124 receives a multi-spatial signal that has been transmitted through a channel, such as through the air, via one or more antennas 126, and outputs a stream of log-likelihood ratios based on the received signals. The sphere decoding methodology 124 seeks to simplify the complexity of the exhaustive search by limiting the amount of constellation points to which distance calculations are made and, consequently, the number of distance terms to be considered in calculating an LLR. FIG. 5B is a diagram 130 illustrating the sphere decoding simplification. In the sphere decoding technique, distance values, $\|y-Hx\|^2$, are only computed for those x such that Hx lies inside a sphere of radius D centered around the received signal, y (i.e., for x such that $\|y-Hx\|^2 \le D^2$). A real/imaginary plot of a received signal is shown at 132. As illustrated in FIG. 5B, the limitation of distance calculations 136 to constellation points 138 within a radius D 134 reduces the number of distance calculations and terms to be considered in LLR calculation to four. While this simplification may offer significant processing savings, it may have a detrimental effect on error performance. Because the set of constellation points 138 within radius D may not have constituent 1s and 0s at every bit location, as is evident in the first bit position where all four constellation points 138 contain '0's at the first position, the LLR calculation formulas described above may have insufficient data to correctly calculate an LLR (e.g., the Max Log Approximation would not have any terms in $x \in x_{k,i}$ from which to select a minimum).

SUMMARY

In accordance with the teachings provided herein, systems and methods are provided for detecting data in a received multiple input/multiple output signal transmitted by a transmitter over multiple spatial streams through a transmission channel. The system may include the step of receiving a first signal on a first spatial stream and a second signal on a second spatial stream, where the first signal is associated with one or more first data values, and the second signal is associated with one or more second data values. The system may further determine a distance value between the received second signal and each possible second data value, where the determining step includes calculating a first coordinate value that identifies coordinates for a hypothetical first signal in light of a first possible second data value and quantizing the first coordinate value to a nearest constellation point. The calculating step and quantizing step may be repeated for each possible second data value to generate a plurality of constellation points, where one constellation point is associated with each possible second data value. The system may determine a distance value between the received second signal and each possible second data value using the calculated constellation point associated with the possible second data value being considered, where one distance value is associated with each possible second data value. The system may then determine a log-likelihood ratio based on the determined distance value associated with each possible second data value.

The system may receive a channel matrix representing the combined effects of the transmission channel and spatial mapping of the transmitter on a transmitted signal, where elements of the received channel matrix are also utilized in the step of determining a distance value. The system may further decode the one or more second data values based on the calculated log-likelihood ratio The steps of calculating a first coordinate value and quantizing the first coordinate may enable the determining a distance value step to be performed without an exhaustive search of all possible first signal values. The systems and methods may further include the step of performing a QR decomposition of the channel matrix, where a portion of the results of the QR decomposition are the elements of the received channel matrix utilized by the step of determining a distance value. The step of determining a distance value may utilize columns of the received channel matrix as the elements of the received channel matrix, where the step of determining a distance value does not utilize elements of a QR decomposition of the channel matrix. Additionally, the distance values may be calculated for a subset of the possible second data values.

The systems and methods may further include the steps of permutating the columns of the channel matrix by multiplying the channel matrix by a permutation matrix. The method may include the step of determining a second distance value between the received first signal and each possible first data value, where the determining step includes calculating a second coordinate value that identifies coordinates for a hypothetical second signal in light of a first possible data value and quantizing the second coordinate value to a nearest second constellation point. The calculating step and quantizing step may be repeated for each possible first data value to generate a plurality of second constellation points, where one second constellation point is associated with each possible first data value. The method may further include determining a second distance value between the received first signal and each possible first data value using elements of the permutated channel matrix and the calculated second constellation point associated with the possible first data value being considered, one second distance value being associated with each possible first data value. The method may determine a second log-likelihood ratio based on the determined second distance value associated with each possible second data value and decode the one or more first data values based on the determined second log-likelihood ratio.

The permutation matrix may be of the form $$P = \begin{bmatrix} 0 & 1 \\ 1 & 0 \end{bmatrix}.$$

The complexity of the method of detecting data may be proportion to a size of the alphabet O (M). The method may detect data transmitted over more than one frequency tone, and the method may detect transmitted OFDM data.

As another example, a method of detecting data in a received multiple input/multiple output signal transmitted by a transmitter over multiple spatial streams through a transmission channel is provided, where the signal represents one of a plurality of alphabet symbols, where each alphabet symbol is associated with a plurality of data bit values. The method may include a step of receiving a first signal ($y_1$) on a first spatial stream and a second signal ($y_2$) on a second spatial stream, the first signal and the second signal being combined to form a y vector ($[y_1, y_2]^T$), the first signal being associated with a first data value ($x_1$) of the alphabet symbol with which the received multiple input/multiple output signal is associated, and the second signal being associated with a second data value ($x_2$) of the alphabet symbol with which the received multiple input/multiple output signal is associated. The method may also receive a channel matrix (H) representing combined effects of the transmission channel and spatial mapping of the transmitter. The method may perform a QR decomposition of the channel matrix (H), such that H=QR, where the Q matrix is a unitary matrix and the R matrix is an upper diagonal matrix, where the R matrix may be represented as $$R = \begin{bmatrix} r_{11} & r_{12} \\ 0 & r_{22} \end{bmatrix}.$$

The method may transform the y vector to an s vector ($[s_1, s_2]^T$) according to the relationship:

$$s = Q^H y.$$

The method may determine a distance value between the received second signal ($y_2$) and each possible second data value ($x_2$), where the determination includes calculating a first coordinate value (F) according to the relationship: $F=(s_1-r_{12}x_2)/r_{11}$, quantizing the first coordinate value (F) to the nearest constellation point ($\hat{x}_1|x_2$), and determining a distance value ($\|y-Hx\|^2$) for the first possible second data value ($x_2$) according to the relationship: $\|y-Hx\|^2=|s_2-r_{22}x_2|^2+|s_1-r_{11}(\hat{x}_1|x_2)-r_{12}x_2|^2$. The method may then repeat the calculating, quantizing, and determining steps for each of the possible second data values ($x_2$) so that one distance value ($\|y-Hx\|^2$) is associated with each possible second data value ($x_2$). Further, the method may determine a log-likelihood ratio for the second data value ($L(b_k^{(i)})$) according to the relationship: $L(b_k^{(i)})=\min(\|y-Hx\|_1^2)-\min(\|y-Hx\|_2^2)$, where $\|y-Hx\|_1^2$ are distance values associated with possible second data values where $b_k^{(i)}=0$ and $\|y-Hx\|_2^2$ are distance values associated with possible second data values where $b_k^{(i)}=1$. The method may also decode the second data value ($x_2$) based on the determined log-likelihood ratio.

The method may further repeat the steps of performing, transforming, determining a distance value, determining a log-likelihood ratio, and decoding utilizing a modified channel matrix that is equal to the received channel matrix multiplied by a permutation matrix, the repeated steps utilizing a symbolic interchange between the first data value ($x_1$) and the second data value ($x_2$). The method may be performed such that the constellation point ($\hat{x}_1|x_2$) selected in the quantizing step fulfills the relationship: $\hat{x}_1|x_2=\arg\min|s_1-r_{11}x_1-r_{12}x_2|^2$, over all possible first data values ($x_1$), without performing a search over all possible first data values ($x_1$).

As a further example, a system is provided for detecting data in a received multiple input/multiple output signal transmitted by a transmitter over multiple spatial streams through a transmission channel. The system may include one or more antennas configured to receive a first signal associated with a first data value and a second signal associated with a second data value. A distance value determiner may be configured to calculate a distance value between the received second signal and each possible second data value. The distance value determiner may include a first coordinate value calculator configured to calculate coordinates for a hypothetical first signal in light of a first possible second data value and a quantizer configured to quantize the first coordinate value to a nearest constellation point, where the first coordinate value calculator and the quantizer may be configured to repeat their functions for each possible second data value. The distance value determiner also may include a distance calculator configured to calculate a distance value between the received second signal and each possible second data value using the calculated constellation points. The system may also includes a log-likelihood ratio determiner configured to determine a log-likelihood ratio based on the determined distance values.

As another example, a system for detecting data in a received multiple input/multiple output signal transmitted by a transmitter over multiple spatial streams through a transmission channel is provided, where the signal is associated with one of a plurality of alphabet symbols that make up an alphabet, each alphabet symbol being associated with a plurality of data bit values. The system may include means for receiving a first signal on a first spatial stream and a second signal on a second spatial stream, where the first signal is associated with one or more first data values of the alphabet symbol with which the received multiple input/multiple output signal is associated, and the second signal is associated with one or more second data values of the alphabet symbol with which the received multiple input/multiple output signal is associated. The system may also include means for receiving a channel matrix representing the combined effects of the transmission channel and spatial mapping of the transmitter on a transmitted signal. The system may further include means for determining a distance value between the received second signal and each possible second data value, where the means for determining include means for calculating a first coordinate value that identifies coordinates for a hypothetical first signal in light of a first possible second data value and means for quantizing the first coordinate value to a nearest constellation point. The means for calculating and means for quantizing may repeat their respective functions for each possible second data value to generate a plurality of constellation points, where one constellation point is associated with each possible second data value. The system may also include means for determining a distance value between the received second signal and each possible second data value using elements of the received channel matrix and the calculated constellation point associated with the possible second data value being considered, where one distance value is associated with each possible second data value. The system further include means for determining a log-likelihood ratio based on the determined distance value associated with each possible second data value and means for decoding the one or more second data values based on the calculated log-likelihood ratio.

DETAILED DESCRIPTION

Figure 6:
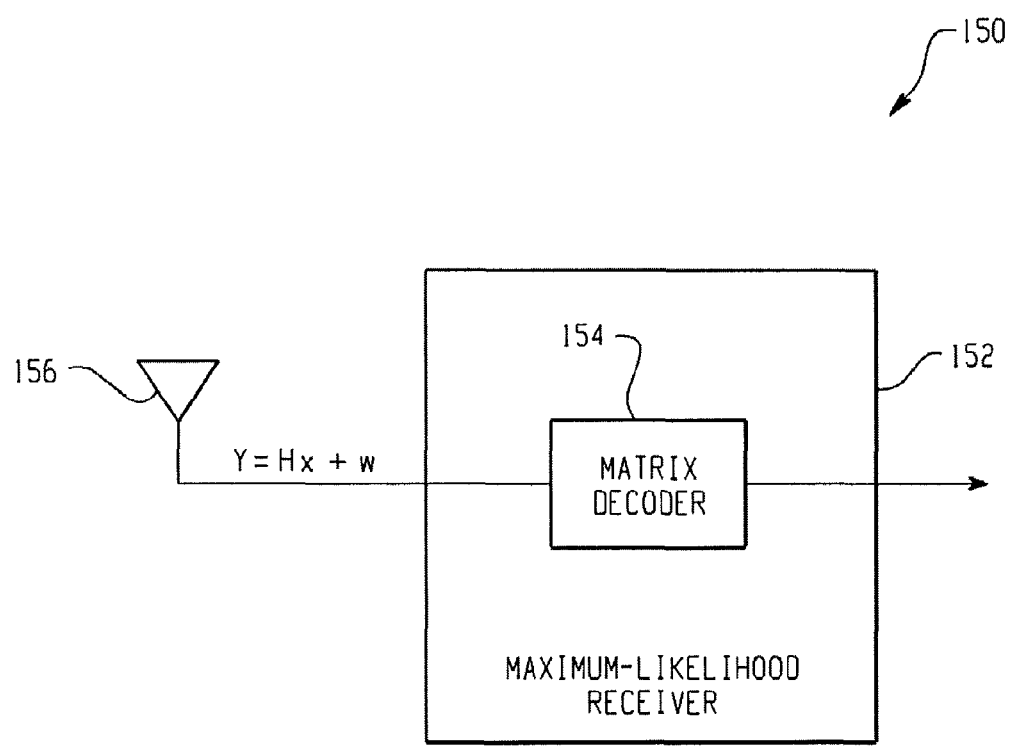
FIG. 6 is a block diagram of a maximum-likelihood receiver that utilizes a matrix decoder.

FIG. 6 is a block diagram 150 of a maximum-likelihood receiver 152 that utilizes a matrix decoder 154 able to perform an O(M) complexity distance and LLR calculation while offering substantially identical error performance as the exhaustive search methodology. The matrix decoder 154 receives, via one or more antennas 156, a first signal (on a first spatial stream) and a second signal (on a second spatial stream) that have been transmitted through a channel and outputs a stream of log-likelihood ratios based on the received signals. The received signals may be represented by the above described relationship: y=Hx+w, where y represents the received signals, x represents the data values sought to be extracted, H is a known channel effect and spatial mapping matrix, and w represents noise. In the two spatial stream case, y is a 2×1 vector ($[y_1, y_2]^T$), x is a 2×1 vector ($[x_1, x_2]^T$), H is a 2×2 vector, and w is a 2×1 vector.

Figure 7:
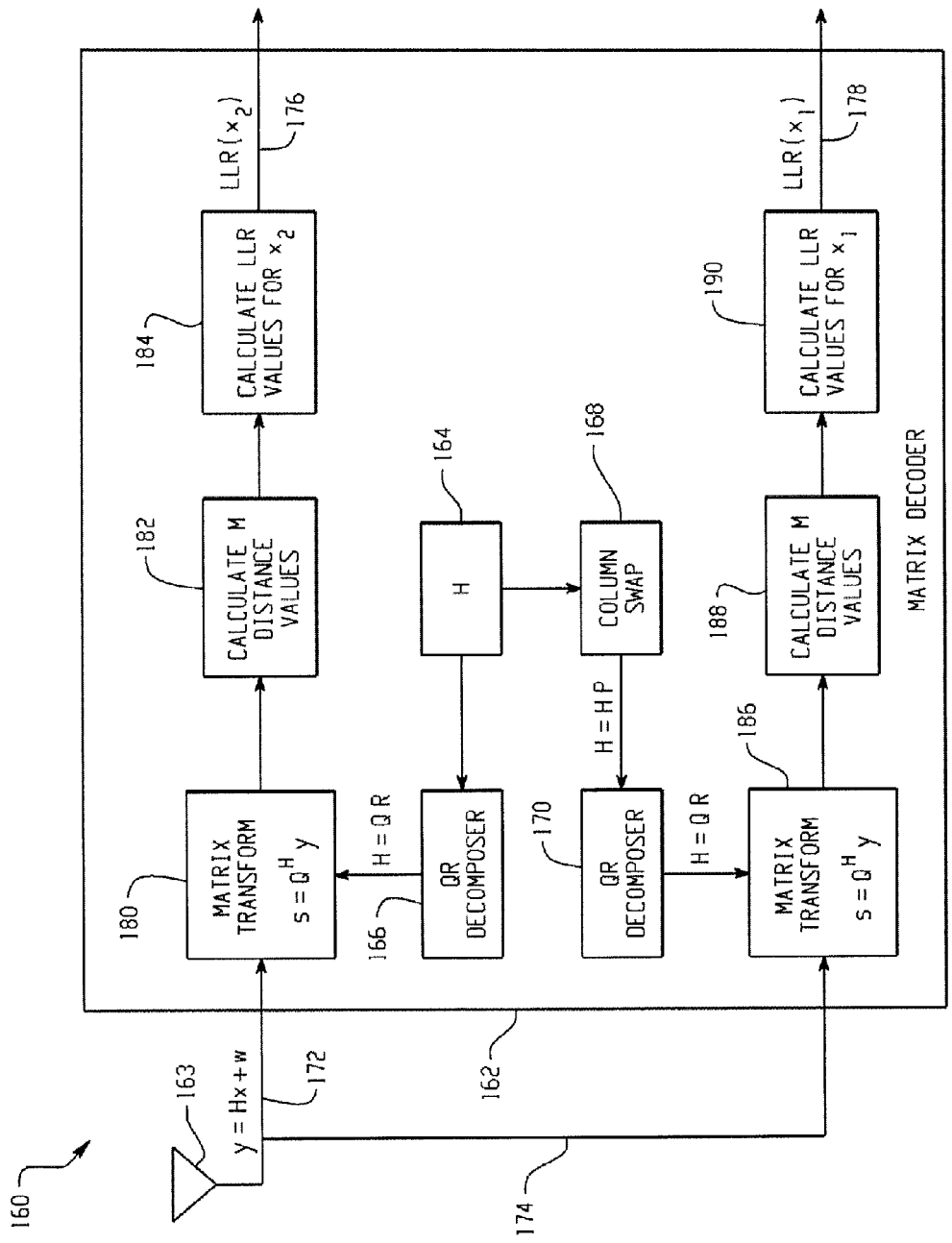
FIG. 7 is a block diagram illustrating internal components of a matrix decoder.

FIG. 7 is a block diagram 160 illustrating example internal components of a matrix decoder 162. Prior to receiving data signals over the one or more antennas 163, matrix calculations are done with respect to the known channel matrix, H 164. As illustrated at 166, a QR decomposition of the H matrix may be performed on the H matrix such that H=QR. The Q matrix is a unitary matrix, and the R matrix is an upper diagonal matrix. In the case of a two spatial stream system, the R matrix may be represented as $$R = \begin{bmatrix} r_{11} & r_{12} \\ 0 & r_{22} \end{bmatrix}.$$

A similar procedure is performed at 168, 170 using a permutated channel matrix. At 168, the channel matrix, H 164, is multiplied by a permutation matrix. In the case of a two spatial stream system, the permutation matrix may be represented as $$P = \begin{bmatrix} 0 & 1 \\ 1 & 0 \end{bmatrix},$$

such that the columns of the channel matrix are swapped when multiplied by the permutation matrix.

Figure 1:
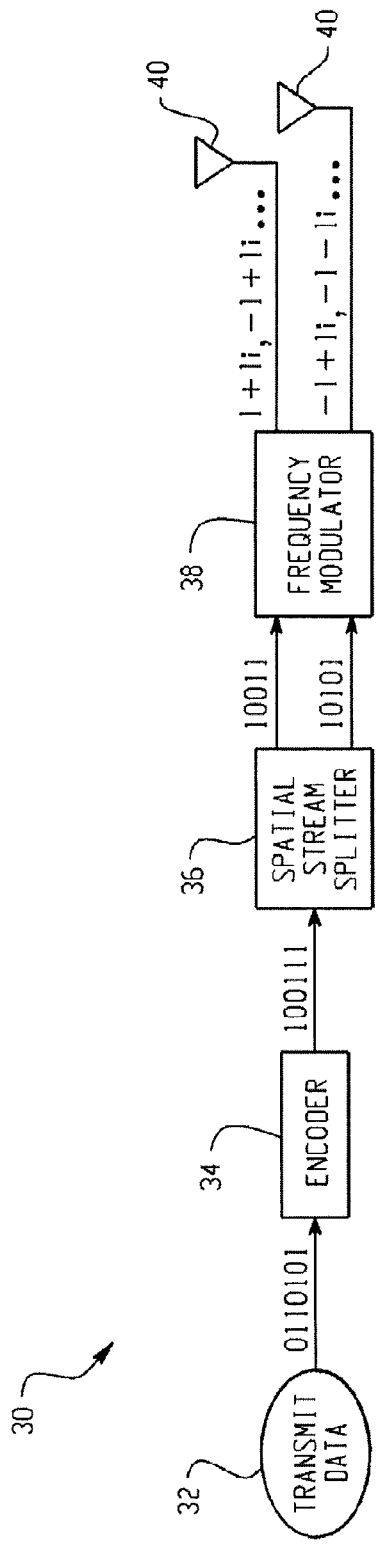
FIG. 1 is a block diagram of a multiple spatial stream transmitter configuration.
Figure 2:
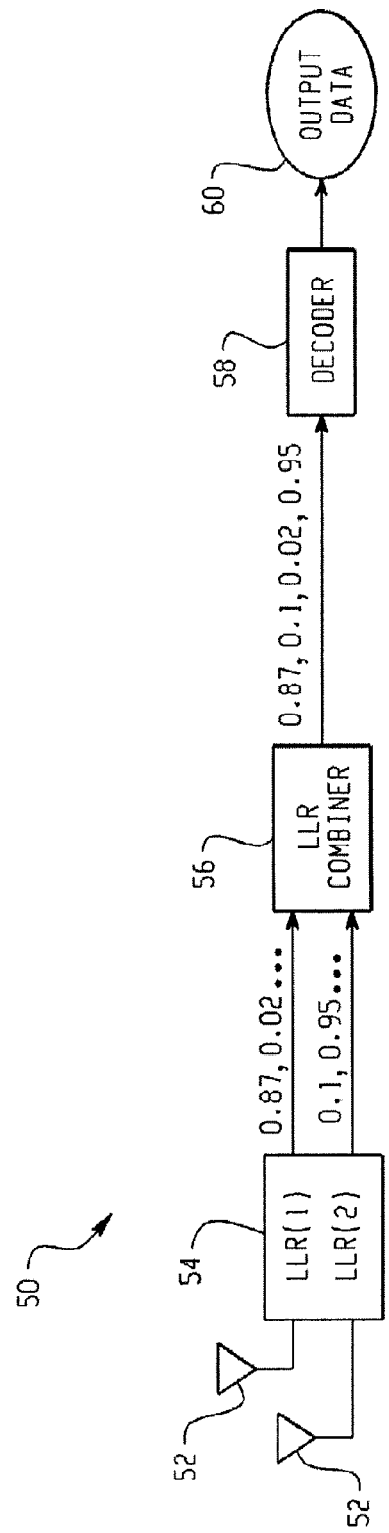
FIG. 2 is a block diagram of a multiple spatial stream receiver configuration.
Figure 3A:
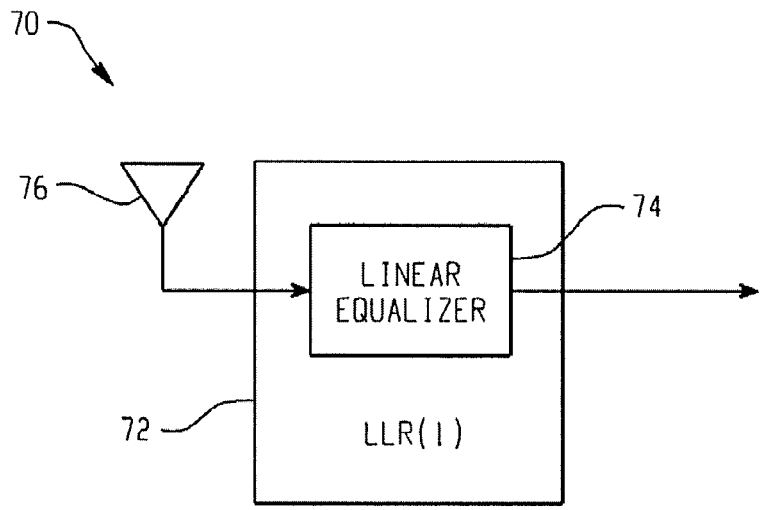
FIG. 3A is a block diagram of a log-likelihood ratio calculator that utilizes a linear equalizer.
Figure 3B:
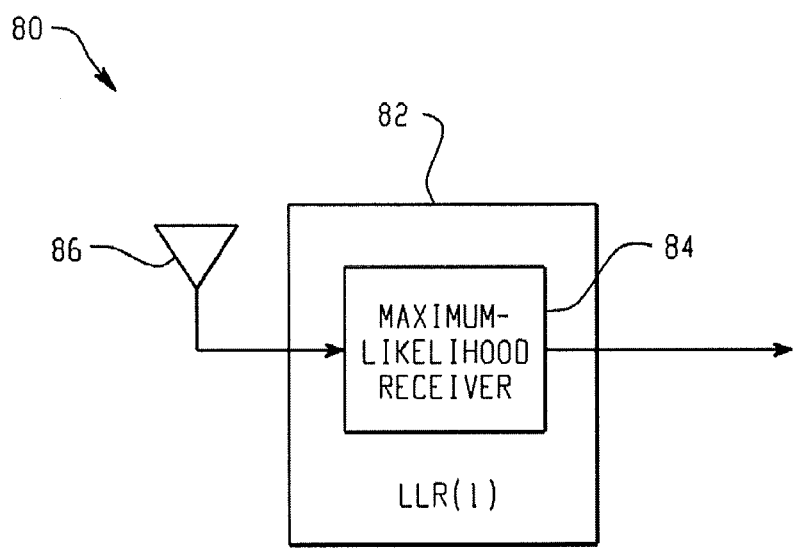
FIG. 3B is a block diagram of a log-likelihood ratio calculator that utilizes a maximum-likelihood receiver.
Figure 4A:
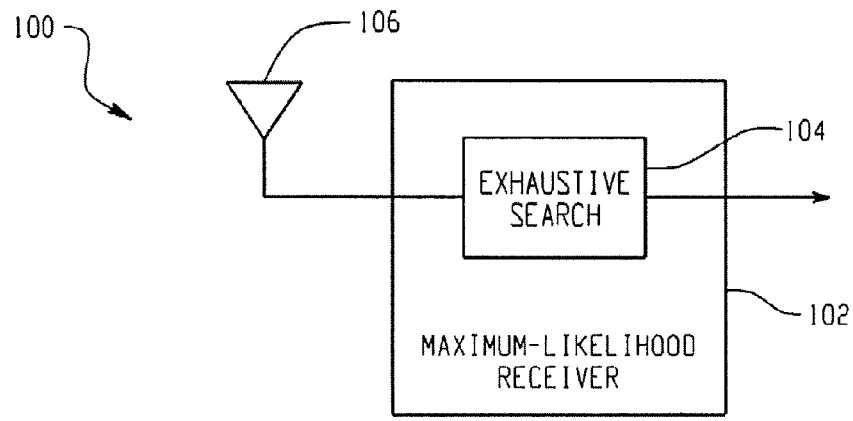
FIG. 4A is a block diagram of a maximum-likelihood receiver that utilizes an exhaustive search methodology.
Figure 4B:
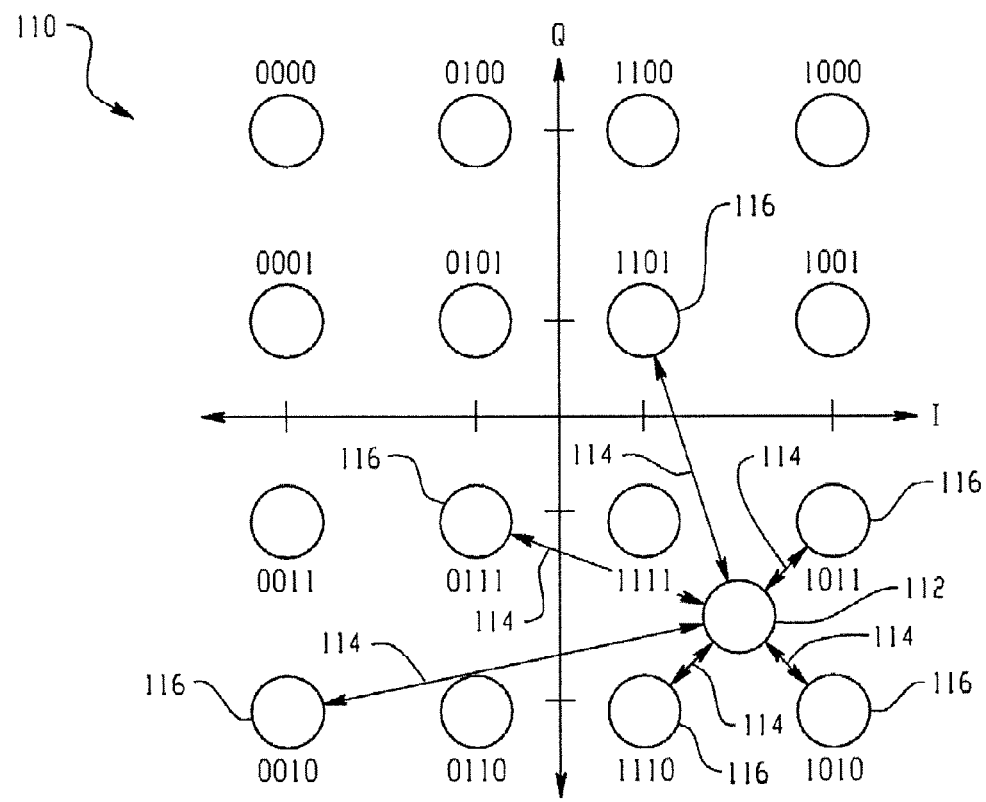
FIG. 4B is a diagram illustrating exemplary calculations for the exhaustive search methodology.
Figure 5A:
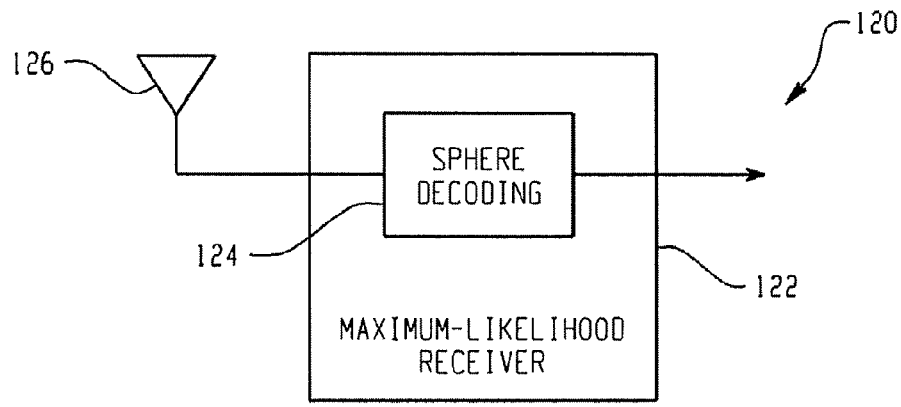
FIG. 5A is a block diagram of a maximum-likelihood receiver that utilizes a sphere decoding simplification.
Figure 5B:
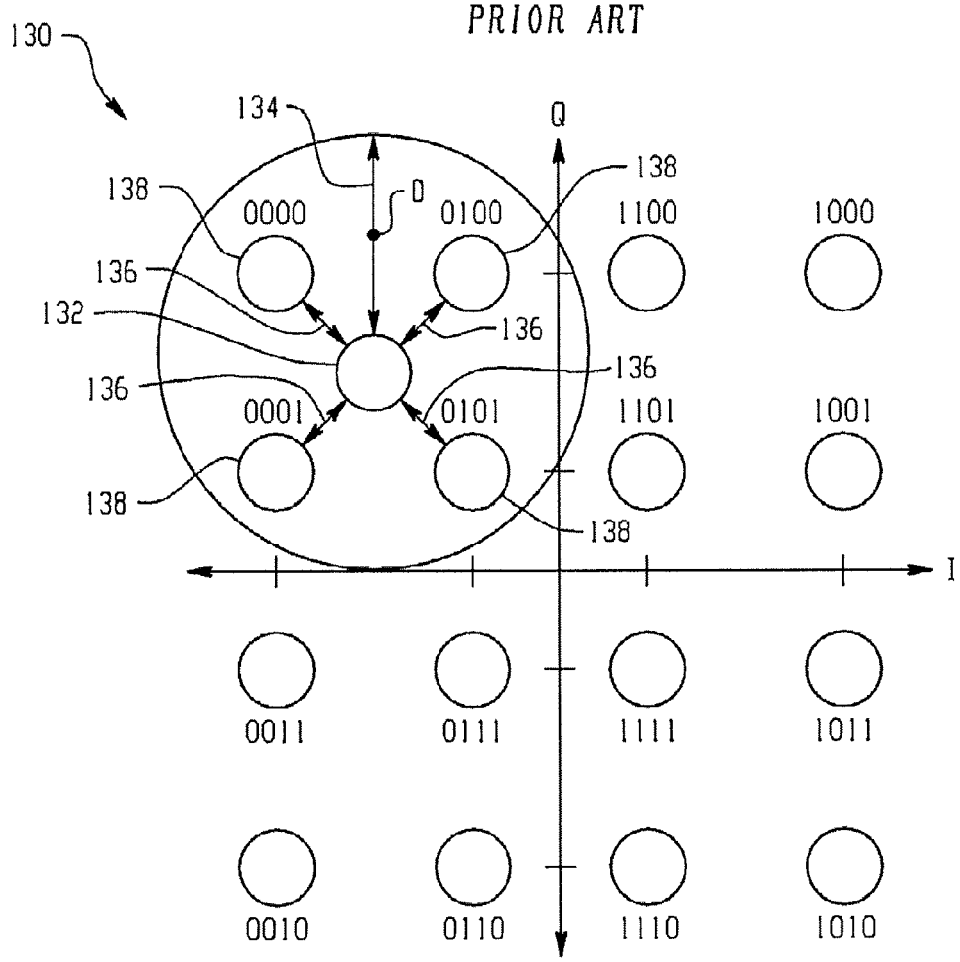
FIG. 5B is a diagram illustrating the sphere decoding simplification.

The matrix decoder 162 executes over two paths 172, 174 that may operate in series or in parallel. The first path 172 calculates log-likelihood ratios 176 for data values associated with the second received spatial stream, and the second path 174 calculates log-likelihood ratios 178 for data values associated with the first received spatial stream. These log-likelihood ratios 176, 178 may be combined and decoded as illustrated above with respect to FIG. 2.

The first path 172 begins at a matrix transformer 180. In a two spatial stream case, the matrix transformer 180 receives the first spatial stream signal and the second spatial stream signal as a 2×1 vector ($[y_1, y_2]^T$). The matrix transformer 180 transforms the received y vector according to the relationship $s=Q^H y$, resulting in a 2×1 s vector ($[s_1, S_2]^T$).

Following the s transformation at 180, a minimum distance value is calculated at 182 for each of the M possible values of $x_2$. In a two spatial stream system having an alphabet size of M, $x_1$ will have M possible values, and $x_2$ will have M possible values resulting in $M^2$ constellation points. The minimum distance value calculated at 182 is calculated according to the formula:

$$\|y-Hx\|^2 = \|s-Rx\|^2 = |s_2 - r_{22}x_2|^2 + |s_1 - r_{11}(\hat{x}_1|x_2) - r_{12}x_2|^2$$

for each possible $x_2$ value. All of these values are known except for $\hat{x}_1|x_2$, which represents the constellation point nearest to a hypothetical $x_1$ value given an $x_2$ value. In other words $\hat{x}_1|x_2$ fulfills the relationship:

$$\hat{x}_1 | x_2 = \arg \min_{x_1 \in A} |s_1 - r_{11}x_1 - r_{12}x_2|^2.$$

Figure 8:
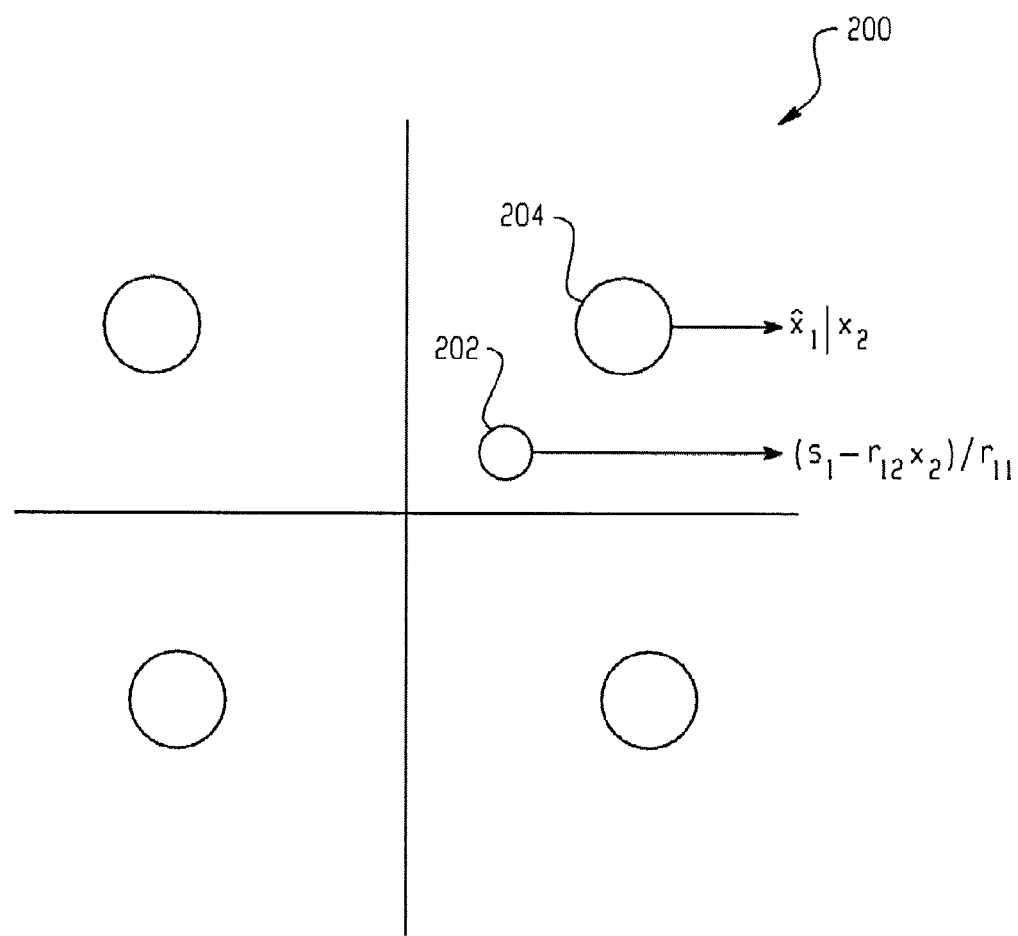
FIG. 8 is a diagram illustrating the calculation of a coordinate value and quantizing the coordinate value to the nearest constellation point.

To avoid an explicit evaluation of this relationship, which would result in a distance calculation of $O(M^2)$ complexity, a scaling/slicing procedure is performed with the same result as an explicit evaluation shown in FIG. 8.

FIG. 8 is a diagram 200 illustrating the calculation of a coordinate value and quantizing the coordinate value to the nearest constellation point. In the scaling/slicing procedure, a first coordinate value, F 202, is calculated according to the formula: $F=(s_1-r_{12}x_2)/r_{11}$. The calculated F value is a complex number. Following calculation of F, the distance calculator 182 quantizes F to the nearest constellation point 204. This nearest constellation point is selected as $\hat{x}_1|x_2$. For example, if F is calculated as 0.8+j0.3, and constellation points are located at (±1, ±j1), then the constellation point at 1+j1 would be selected as $\hat{x}_1|x_2$.

With reference back to FIG. 7, following selection of $\hat{x}_1|x_2$ for one of the possible values of $x_2$, the above described distance formula:

$$\|y-Hx\|^2 = \|s-Rx\|^2 = |s_2 - r_{22}x_2|^2 + |s_1 - r_{11}(\hat{x}_1|x_2) - r_{12}x_2|^2,$$

is evaluated for the current value of $x_2$. The scaling/slicing and distance calculation procedures are then repeated for the next possible $x_2$ value. When distance values for all possible values of $x_2$ have been calculated, a log-likelihood ratio may be calculated as shown at 184 for the data associated with the second spatial stream, $x_2$, using one of the above described formulas, such as the Max Log Approximation. These calculated log-likelihood ratios are output as shown at 176.

A similar process is followed along the second path 174 to calculate log-likelihood ratios for data associated with the first spatial stream. Following permutation of the channel matrix, H, at 168, a QR decomposition is performed at 170 on the permutated channel matrix. The second path 174 begins at a second matrix transformer 186. In a two spatial stream case, the matrix transformer 186 receives the first spatial stream signal and the second spatial stream signal as a 2×1 vector ($[y_1, y_2]^T$). The second matrix transformer 186 transforms the received y vector according to the relationship $s=Q^H y$, resulting in a 2×1 s vector ($[s_1, s_2]^T$).

Following the s transformation at 186, a minimum distance value is calculated at 188 for each of the M possible values of $x_1$ in a similar manner as was described with respect to $x_2$ at 182. The minimum distance value calculated at 182 is calculated according to the formula:

$$\|y-Hx\|^2 = \|s-Rx\|^2 = |s_1 - r_{11}x_1|^2 + |s_2 - r_2(\hat{x}_2|x_1) - r_{12}x_1|^2.$$

All of these values are known except for $\hat{x}_2|x_1$, which represents the constellation point nearest to a hypothetical $x_2$ value given an $x_1$ value. In other words $\hat{x}_2|x_1$ fulfills the relationship:

$$\hat{x}_2 | x_1 = \arg \min_{x_2 \in A} |s_2 - r_{22}x_2 - r_{12}x_1|^2.$$

To avoid an explicit evaluation of this relationship, which would result in a distance calculation of $O(M^2)$ complexity, a scaling/slicing procedure is performed in a similar manner as described above with respect to FIG. 8.

Following selection of $\hat{x}_2|x_1$ for one of the possible values of $x_2$ using the scaling/sliding technique, the above described distance formula:

$$\|y-Hx\|^2 = \|s-Rx\|^2 = |s_1 - r_{11}x_1|^2 + |s_2 - r_2(\hat{x}_2|x_1) - r_{12}x_1|^2,$$

is evaluated for the current value of $x_1$. The scaling/slicing and distance calculation procedures are then repeated for the next possible $x_2$ value. When distance values for all possible values of $x_1$ have been calculated, a log-likelihood ratio may be calculated as shown at 190 for the data associated with the first spatial stream, $x_1$, using one of the above described formulas, such as the Max Log Approximation. These calculated log-likelihood ratios are output as shown at 178.

The calculation and quantization steps of the scaling/slicing procedure are both $O(1)$ operations resulting in a scaling/slicing procedure having an $O(1)$ complexity. This is in contrast to the $O(M)$ complexity of an explicit evaluation of the $\hat{x}_1|x_2$, and $\hat{x}_2|x_1$ formulas above. The $O(1)$ scaling/slicing procedure makes the distance calculation step 182 operate at $O(M)$ complexity. This is in contrast to the $O(M^2)$ complexity of the exhaustive search methodology described above, potentially offering large savings in required hardware and computation time as well as higher throughput. The process described with respect to FIG. 7 also offer the same error performance as the exhaustive search methodology, potentially offering significant error performance gains over other methods such as sphere decoding and zero forcing equalizers.

It should be noted that variations of the above described procedures may be implemented while still achieving successful operation. For example, the scaling/slicing operations for $\hat{x}_1|x_2$, and $\hat{x}_2|x_1$ may be performed using column values of the channel matrix, H, directly. Where $h_1$ corresponds to the first channel matrix column, and $h_2$ corresponds to the second channel matrix column in a two spatial stream context, $\hat{x}_1|x_2$ are sought that fulfill the relationship:

$$\hat{x}_1 | x_2 = \arg \min_{x_1 \in A} |y - h_1 x_1 - h_2 x_2|^2,$$

which may be expanded to: ID-30E $$\hat{x}_1 | x_2 = \arg \min_{x_1 \in A} |h_1^H y - h_1^H h_1 x_1 - h_1^H h_2 x_2|^2.$$

The scaling/slicing operation may then be performed by calculating an F coordinate value:

$$F = (h_1^H y - h_1^H h_2)/h_1^H h_1,$$

and quantizing F to the nearest constellation point to select $\hat{x}_1|x_2$. Similar operations may be performed with respect to $\hat{x}_2|x_1$.

As another variation, distance values may be calculated for only a subset of the M possible values of $x_1$ and $x_2$ as illustrated, for example at 182 and 188 in FIG. 7, using the $O(1)$ calculation techniques for $\hat{x}_1|x_2$ and $\hat{x}_2|x_1$. The selection of which distance values are to be calculated may be done by a variety of methods such as a sphere decoding method as described above or, for example, by selecting a number of points that minimize the expression: $|s_2 - r_{22}x_2|^2$.

Figure 9:
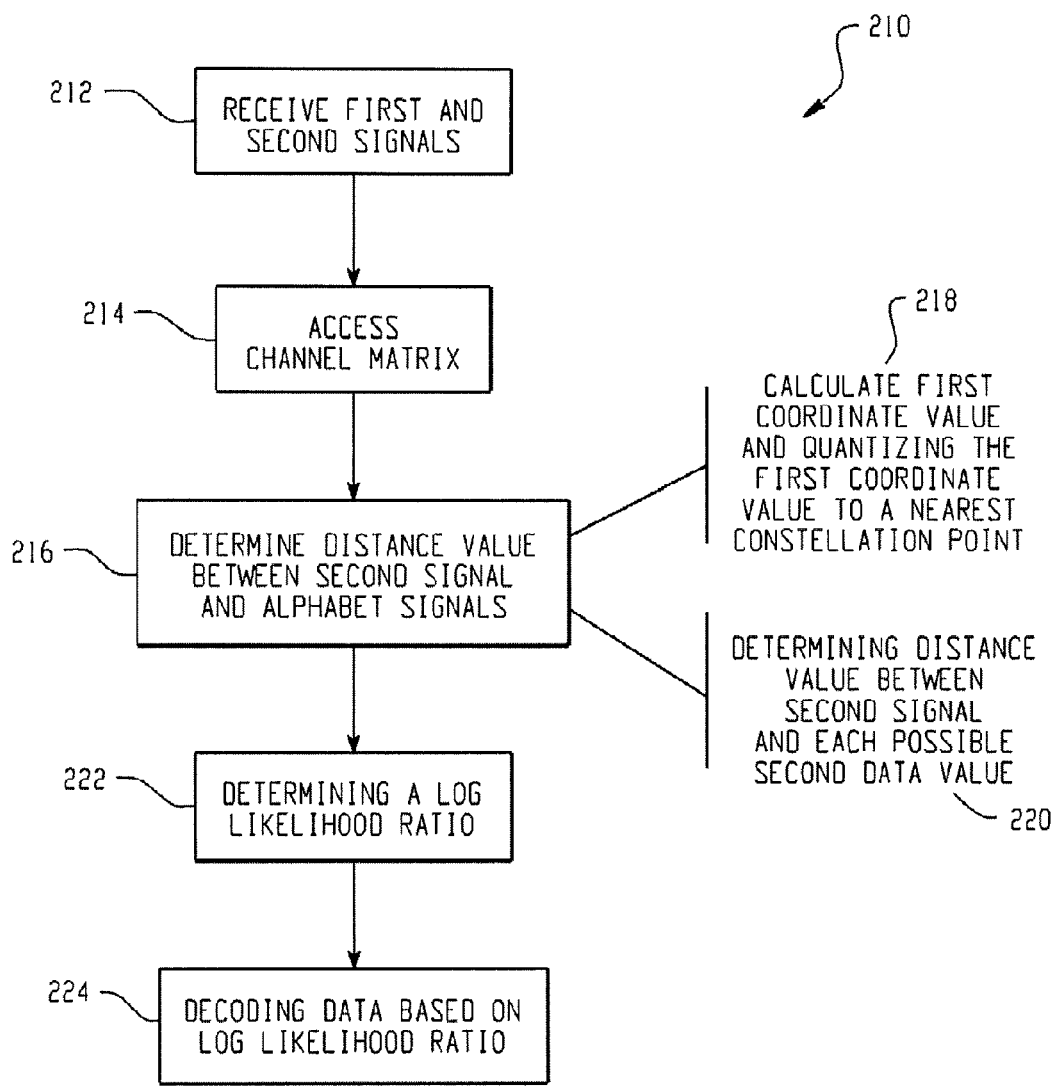
FIG. 9 is a flow diagram illustrating a process for detecting data in a received multiple input/multiple output signal.

FIG. 9 is a flow diagram 210 illustrating a process for detecting data in a received multiple input/multiple output signal transmitted by a transmitter over multiple spatial streams through a transmission channel, the signal being associated with one of a plurality of alphabet symbols that make up an alphabet, each alphabet symbol being associated with a plurality of data bit values. At 212, first and second signals are received. The first signal is received on a first spatial stream, where the first signal is associated with one or more first data values of the alphabet signal with which the received multiple input/multiple output signal is associated. The second signal is received on a second spatial stream, where the second signal is associated with one or more second data values of the alphabet signal with which the received multiple input/multiple output signal is associated. At 214, a channel matrix is received that represents the combined effects of the transmission channel and spatial mapping of the transmitter on a transmitted signal.

At 216, a distance value is determined between the received second signal and each possible second data value. The determining step 216 includes calculating a first coordinate point that identifies coordinates for a hypothetical first signal in light of a first possible second data value and quantizing the first coordinate value to a nearest constellation point as depicted at 218. The calculating step and quantizing step are repeated for each possible second data value to generate a plurality of constellation points, where one constellation point is associated with each possible second data value. The determining step further includes a step of determining a distance value between the received second signal and each possible second data value using elements of the received channel matrix and the calculated constellation point associated with the possible second data value being considered as shown at 220. A determination of a log-likelihood ratio is then calculated at 222 based on the determined distance value associated with each possible second data value, and the one or more second data values are decoded based on the calculated log-likelihood ratio at 224. The order of these steps may be rearranged while still achieving successful results.

The above described concepts may be implemented in a wide variety of applications including those examples described herein below.

Figure 10:
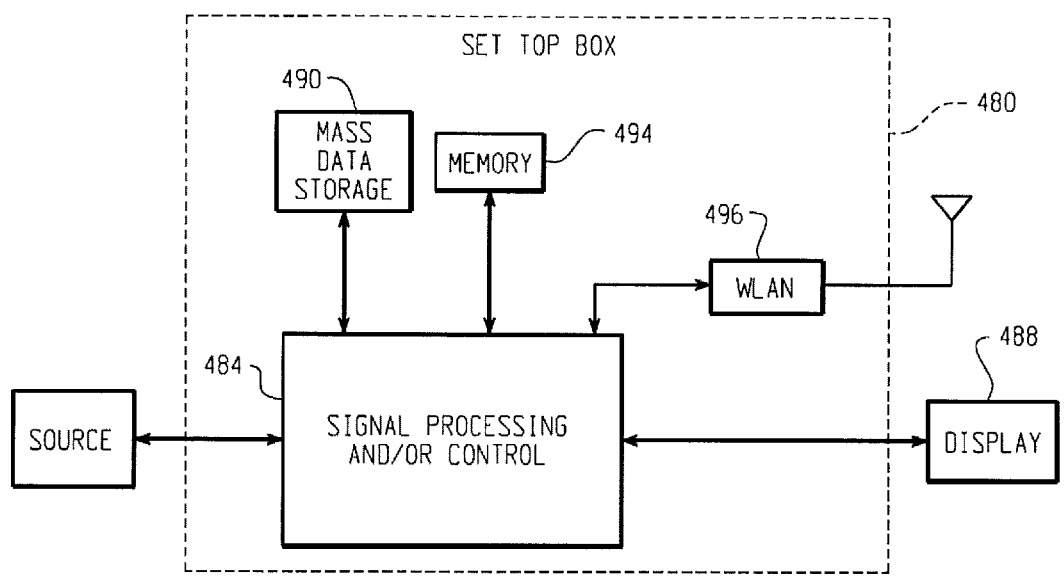
FIG. 10 illustrates an exemplary implementation of the present invention.

Referring now to FIG. 10, the present invention may be embodied in a device 480. The device 480 can be any device capable of wireless communication—e.g., a cellular phone, set top box, smart phone, computer system, and the like. The present invention may implement either or both signal processing and/or control circuits, which are generally identified in FIG. 10 at 484, a WLAN interface and/or mass data storage of the device 480. Signal processing and/or control circuits 484 and/or other circuits (not shown) of the device 480 may process data, perform coding and/or encryption, perform calculations, format data and/or perform any other function as required by an application for the device 480.

The device 480 may communicate with mass data storage 490 that stores data in a nonvolatile manner. Mass data storage 490 may include optical and/or magnetic storage devices for example hard disk drives HDD and/or DVD drives. The device 480 may be connected to memory 494 such as RAM, ROM, low latency nonvolatile memory such as flash memory and/or other suitable electronic data storage. The device 480 also may support connections with a WLAN via a WLAN network interface 496.

This written description uses examples to disclose the invention, including the best mode, and also to enable a person skilled in the art to make and use the invention. It should be noted that the systems and methods described herein may be equally applicable to other frequency modulation encoding schemes. The patentable scope of the invention may include other examples.

It is claimed:

1. A method of detecting data in a received multiple input/multiple output signal that is transmitted by a transmitter over multiple spatial streams through a transmission channel, the method comprising:
receiving, on a first spatial stream, a first signal that is associated with one or more first data values;
receiving a channel matrix representing combined effects of (i) the transmission channel and (ii) a spatial mapping of the transmitter on a transmitted signal;
permutating columns of the channel matrix;
determining a distance value between the received first signal and each of the possible first data values, by
calculating a second coordinate value that identifies coordinates for a hypothetical second signal according to each of the possible first data values,
quantizing the second coordinate value to a nearest second constellation point,
repeating the calculating and the quantizing for each of the possible first data values to generate a plurality of second constellation points, one second constellation point being associated with each of the possible first data values, and
determining the distance value between the received first signal and each of the possible first data values using elements of (i) the permutated columns of the channel matrix and (ii) the second constellation point associated with the possible first data value being considered, wherein one distance value is associated with each of the possible first data values.

2. The method of claim 1, further comprising:
determining a log-likelihood ratio based on the determined distance value for each of the possible first data values.

3. The method of claim 2, further comprising:
decoding the one or more first data values based on the determined log-likelihood ratio.

4. The method of claim 2, further comprising:
receiving, on a second spatial stream, a second signal that is associated with one or more second data values; and
decoding the one or more second data values based on the calculated log-likelihood ratio.

5. The method of claim 1, wherein the permutating includes permutating the columns of the channel matrix by multiplying the channel matrix by a permutation matrix.

6. The method of claim 5, wherein the permutation matrix is $$\begin{bmatrix} 0 & 1 \\ 1 & 0 \end{bmatrix}.$$

7. The method of claim 1, wherein the calculating and the quantizing enable the determining of the distance value to be performed without an exhaustive search of all possible first data values.

8. The method of claim 1, wherein distance values are calculated for a subset of the possible first data values.

9. The method of claim 1, wherein a complexity of the method is proportional to a size of an alphabet associated with the received multiple input/multiple output signal.

10. The method of claim 1, wherein the method detects data transmitted over more than one frequency tone.

11. The method of claim 1, wherein the method detects transmitted orthogonal frequency division multiplexing (OFDM) data.

12. A method of detecting data in a received multiple input/multiple output signal that is transmitted by a transmitter over multiple spatial streams through a transmission channel, wherein the received multiple input/multiple output signal represents one of a plurality of alphabet symbols, wherein each of the plurality of alphabet symbols is associated with a plurality of data bit values, the method comprising:
receiving (i) a first signal ($y_1$) on a first spatial stream and (ii) a second signal ($y_2$) on a second spatial stream, the first signal and the second signal being combined to form a y vector ($[y_1, y_2]^T$), wherein the first signal is associated with a first data value ($x_1$) of the alphabet symbol with which the received multiple input/multiple output signal is associated, wherein the second signal is associated with a second data value ($x_2$) of the alphabet symbol with which the received multiple input/multiple output signal is associated;
receiving a channel matrix (H) representing combined effects of (i) the transmission channel and (ii) a spatial mapping of the transmitter;
performing a QR decomposition of the channel matrix (H), such that H=QR, wherein Q matrix is a unitary matrix, and R matrix is an upper diagonal matrix corresponding to $$\begin{bmatrix} r_{11} & r_{12} \\ 0 & r_{22} \end{bmatrix};$$

transforming the y vector to an s vector ($[s_1, s_2]^T$) according to the relationship: $s=Q^H y$;
determining a distance value between the received second signal ($y_2$) and each possible second data value ($x_2$), the determining including
calculating a first coordinate value (F) according to the relationship: $F=(s_1-r_{12}x_2)/r_{11}$,
quantizing the first coordinate value (F) to the nearest constellation point ($\hat{x}_1|x_2$),
determining a distance value ($\|y-Hx\|^2$) for the first possible second data value ($x_2$) according to the relationship: $\|y-Hx\|^2=|s_2-r_{22}x_2|^2+|s_1-r_{11}(\hat{x}_1|x_2)-r_{12}x_2|^2$, and
repeating the calculating, quantizing, and determining for each of the possible second data values ($x_2$) so that one distance value ($\|y-Hx\|^2$) is associated with each possible second data value ($x_2$).

13. The method of claim 12, wherein the constellation point ($\hat{x}_1|x_2$) selected in the step of quantizing the first coordinate value (F) in accordance with the relationship: $\hat{x}_1|x_2=\arg\min|s_1-r_{11}x_1-r_{12}x_2|^2$ over all possible first data values ($x_1$), without performing a search over all possible first data values ($x_1$).

14. The method of claim 12, wherein the method detects data transmitted over more than one frequency tone.

15. A system for detecting data in a received multiple input/multiple output signal that is transmitted by a transmitter over multiple spatial streams through a transmission channel, the system comprising:
   one or more antennas configured to receive, on a first spatial stream, a first signal that is associated with one or more first data values;
   a permutator configured to permutate columns of a channel matrix, wherein the channel matrix represents combined effects of the transmission channel and spatial mapping of the transmitter on a transmitted signal;
   a distance value determiner configured to calculate a distance value between the received first signal and each of the possible first data values, by
      calculating a second coordinate value that identifies coordinates for a hypothetical second signal according to each of the possible first data values,
      quantizing the second coordinate value to a nearest second constellation point,
      repeating the calculating and quantizing for each of the possible first data values to generate a plurality of second constellation points, wherein one second constellation point is associated with each of the possible first data values, and
      determining a distance value between the received first signal and each of the possible first data values using elements of the permutated channel matrix and the calculated second constellation point associated with the possible first data value being considered, wherein one distance value is associated with each of the possible first data values.

16. The system of claim 15 further comprising:
   a log-likelihood ratio determiner configured to determine a log-likelihood ratio based on the determined distance value associated with each of the possible first data values.

17. The system of claim 16 further comprising:
   a decoder configured to decoding the one or more first data values based on the determined log-likelihood ratio.

18. The system of claim 15, wherein the permutator is configured to permutate the columns of the channel matrix by multiplying the channel matrix by a permutation matrix.

19. The system of claim 18, wherein the permutation matrix is $$\begin{bmatrix} 0 & 1 \\ 1 & 0 \end{bmatrix}.$$

20. The system of claim 15, wherein the system detects data transmitted over more than one frequency tone.

* * * * *